United States Patent
Wang et al.

(10) Patent No.: US 7,908,522 B2
(45) Date of Patent: Mar. 15, 2011

(54) NETWORK CARD TESTING METHOD

(75) Inventors: Zhi Wang, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 756 days.

(21) Appl. No.: 11/976,371

(22) Filed: Oct. 24, 2007

(65) Prior Publication Data

US 2009/0113455 A1 Apr. 30, 2009

(51) Int. Cl.
*G06F 11/22* (2006.01)
(52) U.S. Cl. .............. 714/43; 714/36; 714/44
(58) Field of Classification Search .......... 714/43, 714/36, 44
See application file for complete search history.

(56) References Cited

U.S. PATENT DOCUMENTS

| | | | |
|---|---|---|---|
| 2003/0110415 A1* | 6/2003 | Podgorsky et al. | 714/36 |
| 2003/0135785 A1* | 7/2003 | Carr | 714/25 |
| 2005/0071621 A1* | 3/2005 | Rothman et al. | 713/2 |
| 2008/0072027 A1* | 3/2008 | Zimmer et al. | 713/1 |

* cited by examiner

*Primary Examiner* — Scott T Baderman
*Assistant Examiner* — Chae Ko
(74) *Attorney, Agent, or Firm* — Tim Tingkang Xia; Morris, Manning & Martin, LLP

(57) ABSTRACT

A network card testing method, used to test if the network card is capable of functioning normally in a computer having Extended Firmware Interface (EFI) system. Wherein, in a protocol assignment table is recorded the connection relations of a network protocol of Extended Firmware Interface, and a driver program corresponding to a network driver interface specification (NDIS) layer. In addition, the driver corresponding to the network card is loaded at the NDIS layer. In implementing the network card test program, though the utilization of an additionally written EFI pseudo program as a medium of transmitting data for the network card testing program, and also though the utilization of an additionally written intermediate filter driver in invoking a driver suitable for the network card, the hardware testing of network card can be realized, thus increasing the category and scope of the network card testing supported by an EFI system.

5 Claims, 4 Drawing Sheets

NETWORK CARD TESTING METHOD

BACKGROUND

1. Field of Invention

The invention relates to a network card testing method and in particular to a method for hardware testing of the network card through an intermediate driver program in an Extended Firmware Interface (EFI) system.

2. Related Art

Usually, upon completion of development and manufacturing of a network card, it has to be loaded into a server or computer to test if its various functions are capable of functioning normally. In general, the various functions of a network card must be driven by the corresponding driver programs. Thus, in order to test a network card, the driver programs must also be loaded into a server or a computer. In addition, a test platform (or an operation system) is also required by a server or computer for executing (or controlling) the testing flow. In this regard, an Extended Firmware Interface (EFI) system can be considered equivalent to a miniature Operation System having basic input/output capabilities, as such, it can be considered as a brand new miniature platform of operation system. Since EFI and BIOS are designed in the same level, and both are located close to a hardware equipment layer. For this reason, usually, the EFI system is utilized by system test personnel as a hardware function test platform in testing the hardware equipment of the above-mentioned network card.

In implementing the test of network card utilizing an EFI system, the following conditions are usually required: firstly, a server (or computer) incorporating an EFI system; secondly, the driver which driving the network card to be tested must be supported by that server (or computer). However, since EFI system is not so widely utilized and the driver supporting the network card are rather limited, thus the test of some of network cards can not be carried out in an EFI system. Moreover, the network card driver supported by EFI system may not be capable of realizing and producing some of the functions of that network card, thus a complete and thorough hardware test of a network card can not be achieved. If the problem of insufficient support of EFI system for the driver concerning the network card hardware equipment can be improved, then the test operator may utilize a test platform closely located to a hardware equipment layer, such as an EFI system to proceed with hardware testing, as such increasing the testing speed.

SUMMARY OF THE INVENTION

In view of the insufficient support for the driver program concerning the hardware equipment of network card in an EFI system, the objective of the invention is to develop and provide an EFI pseudo program and an intermediate driver (procedure) to serve as an interface for transmitting and receiving data though invoking a driver supporting a network card, hereby increasing the categories of network cards that can be supported by EFI system, and widening the scope of hardware testing of network card that can be performed in an EFI system significantly.

In order to increase the categories of network cards supported by an EFI system, thus achieving the objective of hardware testing of network card through utilizing an EFI system, the network card testing method of the invention includes the following steps: firstly, activating an EFI system and loading in an EFI network protocol, registering the EFI network protocol into a protocol assignment table; next, binding a network card, an EFI network protocol, and a driver of network driver interface specification (NDIS) layer corresponding to that network card; then, activating an EFI pseudo program, an intermediate filter driver program, and a network card testing program; subsequently, receiving several testing items of network card testing program through utilizing the EFI pseudo program, and generating the corresponding test events; and finally, invoking the driver program corresponding to the network card according to a protocol assignment table by making use of an intermediate filter program, and performing a plurality of network function tests corresponding to these test events.

In a network card testing method according to a preferred embodiment of the invention, the network function includes: establishing connection to a remote terminal, transmitting data, receiving data, adjusting data transmission speed, and disconnecting the connection to the remote terminal. To achieve the objective, a protocol assignment table has to be established in an EFI system. This protocol assignment table is a single direction connection table, and is used to record the connection relations between/among EFI network protocols, network cards, and the driver required to be invoked by the corresponding network card. When a network card is placed into a computer, or it is detected by the computer that the replacement of another network card, the computer executes (or re-executes) an operation binding the connection relations of the network card (or a network card newly placed in), EFI network protocol, and a driver of the NDIS layer which corresponding to that network card. In addition, an EFI pseudo program is used to store testing data through an output shared register area, and trigger an intermediate filter driver to read this testing data through an output access function in testing the network functions of the network card. Upon receiving the data packets from foreign network by a network card, the intermediate filter driver is then used to intercept the data packets of network card and store them in a input shared register area, and trigger the EFI pseudo program to read the data packets through an input access function, and then the data thus obtained is transmitted by the EFI pseudo program to a network card testing program to verify the testing results.

Summing up the above, the driver of a variety of network cards are specified in advance by network driver interface specification layer (NDIS), and a protocol assignment table is used to record EFI network protocol and the binding network card driver. As such, data transmission is realized through the mutual data communication between an EFI pseudo program written and an intermediate filter driver, and a driver corresponding to the network card under test as invoked by an intermediate filter driver, thus achieving the objective of supporting various network cards through an EFI system, and testing hardware of network card by making use of an EFI system.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow and that is for illustration only, and thus are not limitative of the present invention, and wherein.

DETAILED DESCRIPTION OF THE INVENTION

The purpose, construction, features, and functions of the invention can be appreciated and understood more thoroughly through the following detailed description with reference to the attached drawings.

In the following, the characteristics and implementation of the invention will be described in detail through preferred embodiments together with the accompanying drawings.

Figure 1:
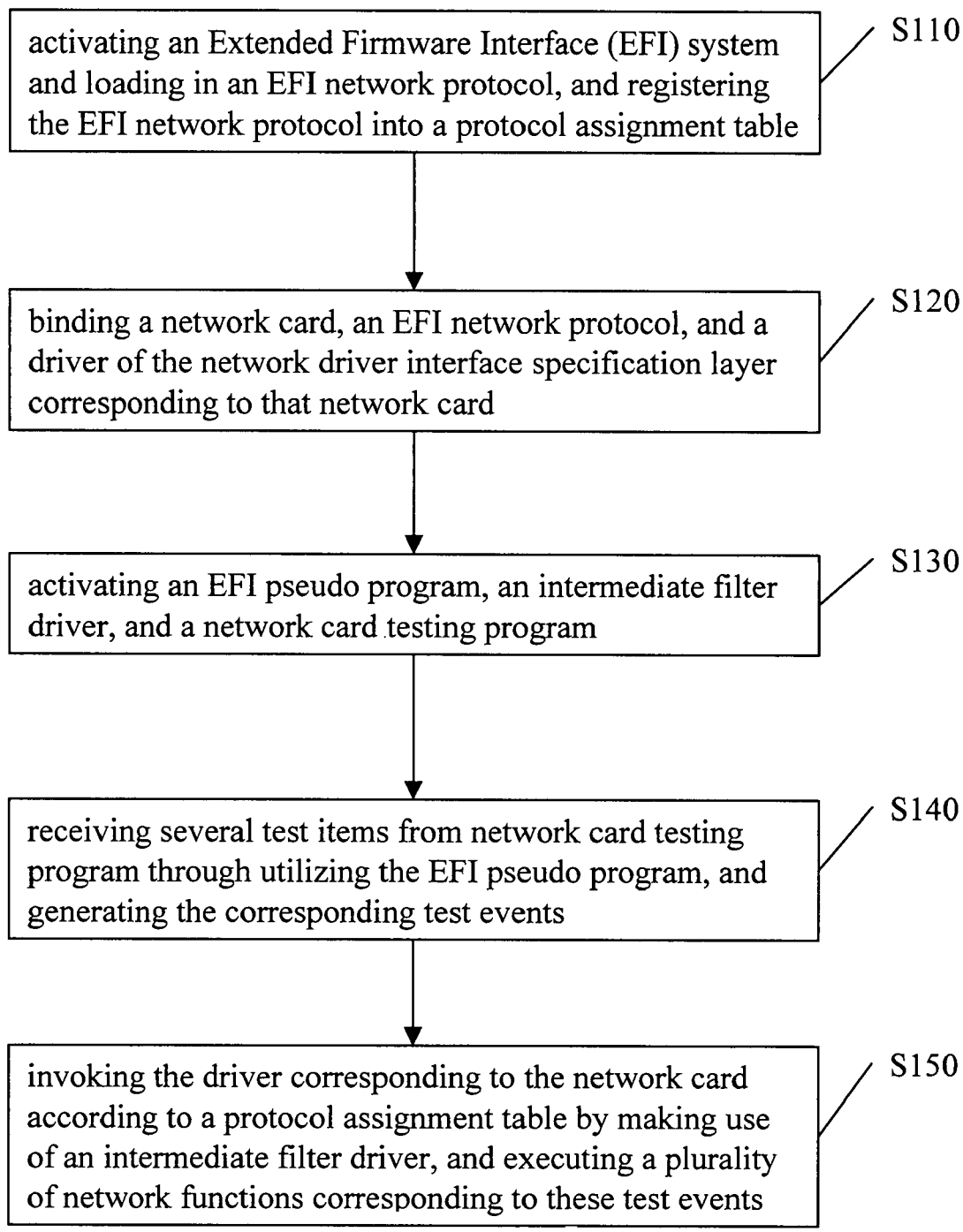
FIG. 1 is a system flowchart of a network card test method according to a preferred embodiment of the invention.

Refer to FIG. 1 for a system flowchart of a network card testing method according to a preferred embodiment of the invention. As shown in FIG. 1, the network card testing method of the invention includes the following steps: firstly, activating an Extended Firmware Interface (EFI) system and loading in an EFI network protocol, and registering the EFI network protocol into a protocol assignment table (step S110); next, binding a network card, an EFI network protocol, and a driver of network driver interface specification (NDIS) layer corresponding to that network card (step S120); then, activating an EFI pseudo program, an intermediate filter driver, and a network card testing program (step S130); subsequently, receiving several testing items of network card test program through utilizing the EFI pseudo program, and generating the corresponding test events (step S140); and finally, invoking the driver program corresponding to the network card according to a protocol assignment table by making use of an intermediate filter program, and performing a plurality of network function tests corresponding to these test events (step S150).

When it is detected by the computer that the replacement of another network card, the connection relation of the following has to be rebind: the newly placed network card, an EFI network protocol, and a driver program of network driver program interface specification layer corresponding to that network card, and this newly bonded connection relation has to be recorded in the protocol assignment table. In a preferred embodiment of the invention, a network card testing program is performed by a computer having EFI system under direction of test personnel. A network driver program interface specification layer is added in an EFI system, that is capable of supporting the driver programs of a variety of network cards. In some of the embodiments, the supporting driver programs can be additionally added. Moreover, an EFI system is used to load in the user-written EFI pseudo program and an intermediate filter driver program, so as to execute the above-mentioned network card test method.

Figure 2:
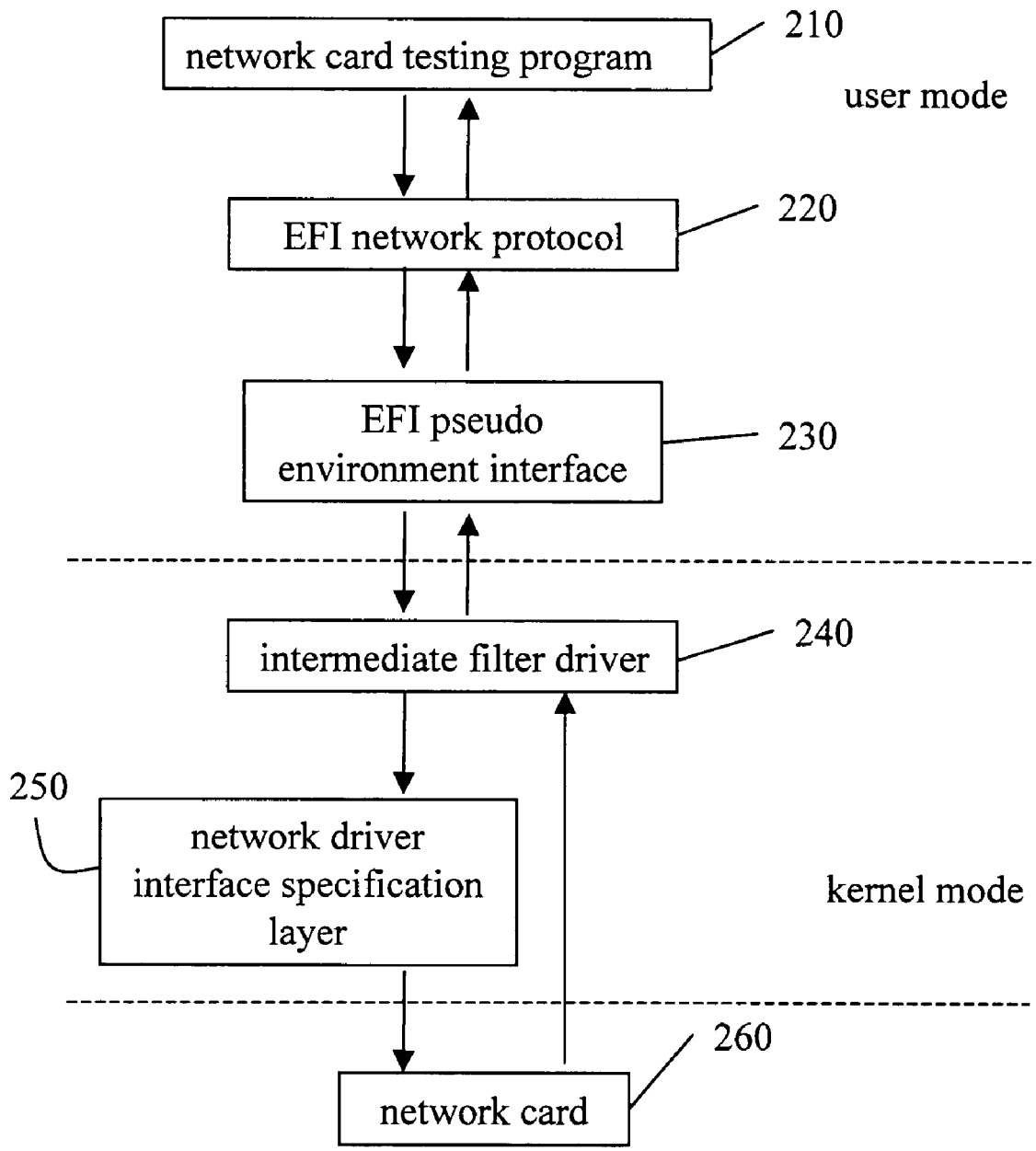
FIG. 2 is a schematic diagram of data flow in network card testing according to a preferred embodiment of the invention.

Before going into details in describing the network card test method of the invention, the data flow in a network card testing are first described. Refer to FIG. 2 for a schematic diagram of data flow in network card testing according to a preferred embodiment of the invention. As shown in FIG. 2, the network card testing program 210 is an application program executed in user mode, and various test items are performed by this network card testing program 210 under the direction of testing operator. In this embodiment, the objective for the case is for example: establishing connections to a server at remote terminal for accessing the files, and calculating the bit-error rate of data transmission, thus testing the various network functions of establishing connection to a remote end, transmitting data, receiving data, adjusting data transmission speed, and disconnecting the connection to the remote terminal.

In implementing the network card test program, the EFI system loads in EFI network protocol 220, and triggers an EFI pseudo program and an intermediate filter driver 240 used for performing data writing. The EFI pseudo environment interface 230 is a subprogram of EFI pseudo program, and is used to receive the messages transmitted by a network card test program 210 (executing a command for establishing connection to remote terminal and a command for fetching and sending back files), and transmit them to an intermediate filter driver 240. The intermediate filter driver 240 utilizes a driver program corresponding to a network card through requesting a NDIS layer 250, hereby driving a network card in proceeding with the connection to a remote end. The data packets transmitted back from the server pass through the intermediate filter driver 240, the EFI pseudo environment interface 230, and EFI network protocol 220 sequentially, and are transmitted to network card test program 210, and these data packets are analyzed to obtain the testing results (such as the bit error rate of the transmitted data).

Figure 3:
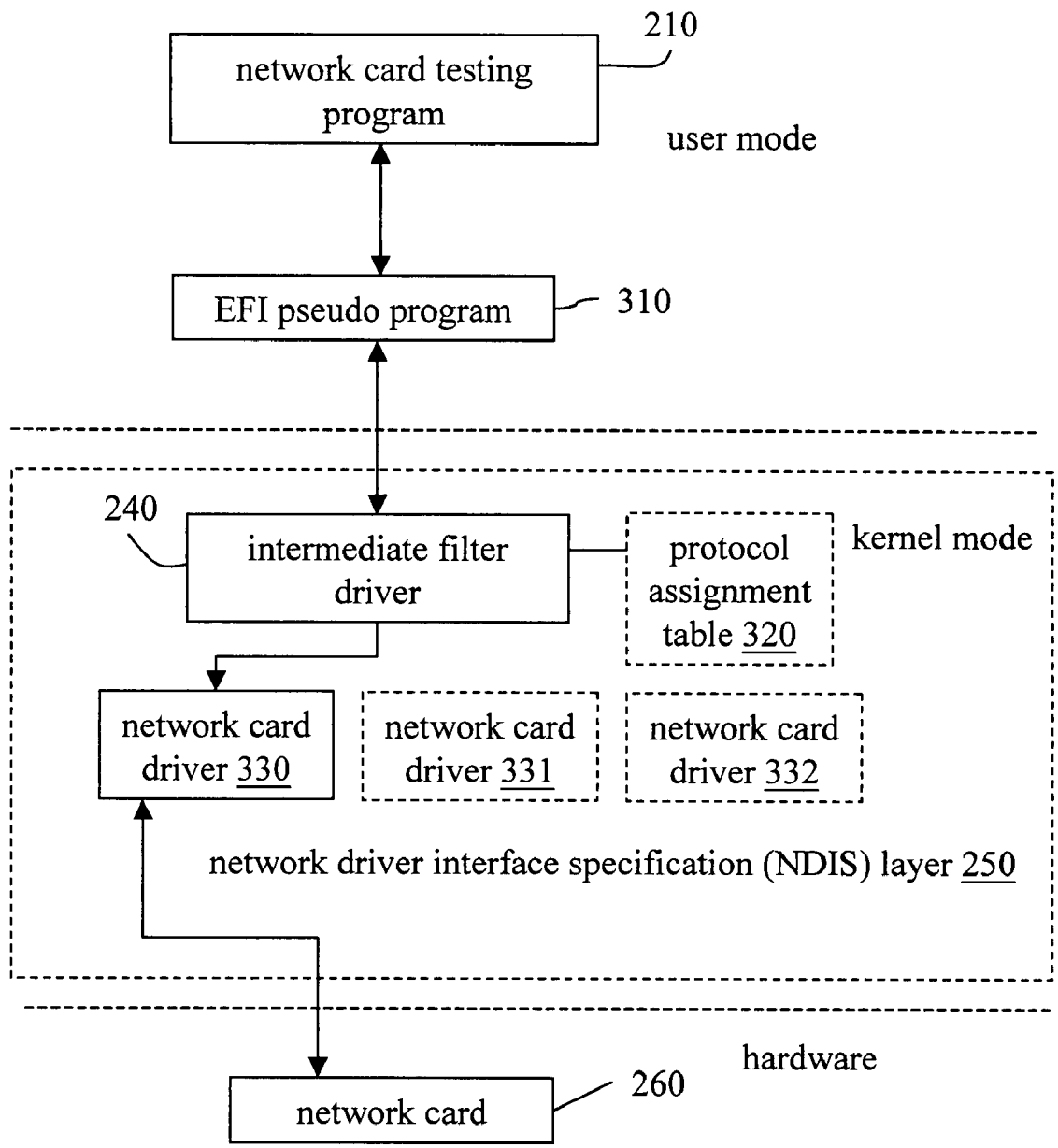
FIG. 3 is a block diagram of a stack structure layout of elements utilized in implementing the network card testing method according to a preferred embodiment of the invention.

Refer to FIG. 3 for a block diagram of a structured layout of elements utilized in implementing the network card testing method according to a preferred embodiment of the invention. As shown in FIG. 3, in this case an EFI system is divided into a user mode and a kernel mode, then the network card testing program 210 and EFI pseudo program 310 belong to the application programs of user mode, while the intermediate filter driver 240 belongs to that of kernel mode. In operation, the execution of network card test program 210 of user mode triggers the execution of EFI pseudo program 310 and the intermediate filter driver 240 of kernel mode. Moreover, in NDIS layer 250, a plurality of network card drivers (330,331, 332) are provided and a protocol assignment table 320 are provided. The protocol assignment table is a single direction connection table, in which is record the connection relations between EFI network protocol, network card, and the driver programs corresponding to the network card. Upon receiving the command messages from network card test program by EFI pseudo program, it generates a plurality of corresponding test events. And on receiving these test events, the intermediate filter driver 240 reads and look-ups the protocol assignment table 320 to obtain the network card driver required to be invoked (such as invoking network card driver program 330 in this embodiment), thus driving network card 260 in proceeding with the actions corresponding to the test events.

Figure 4:
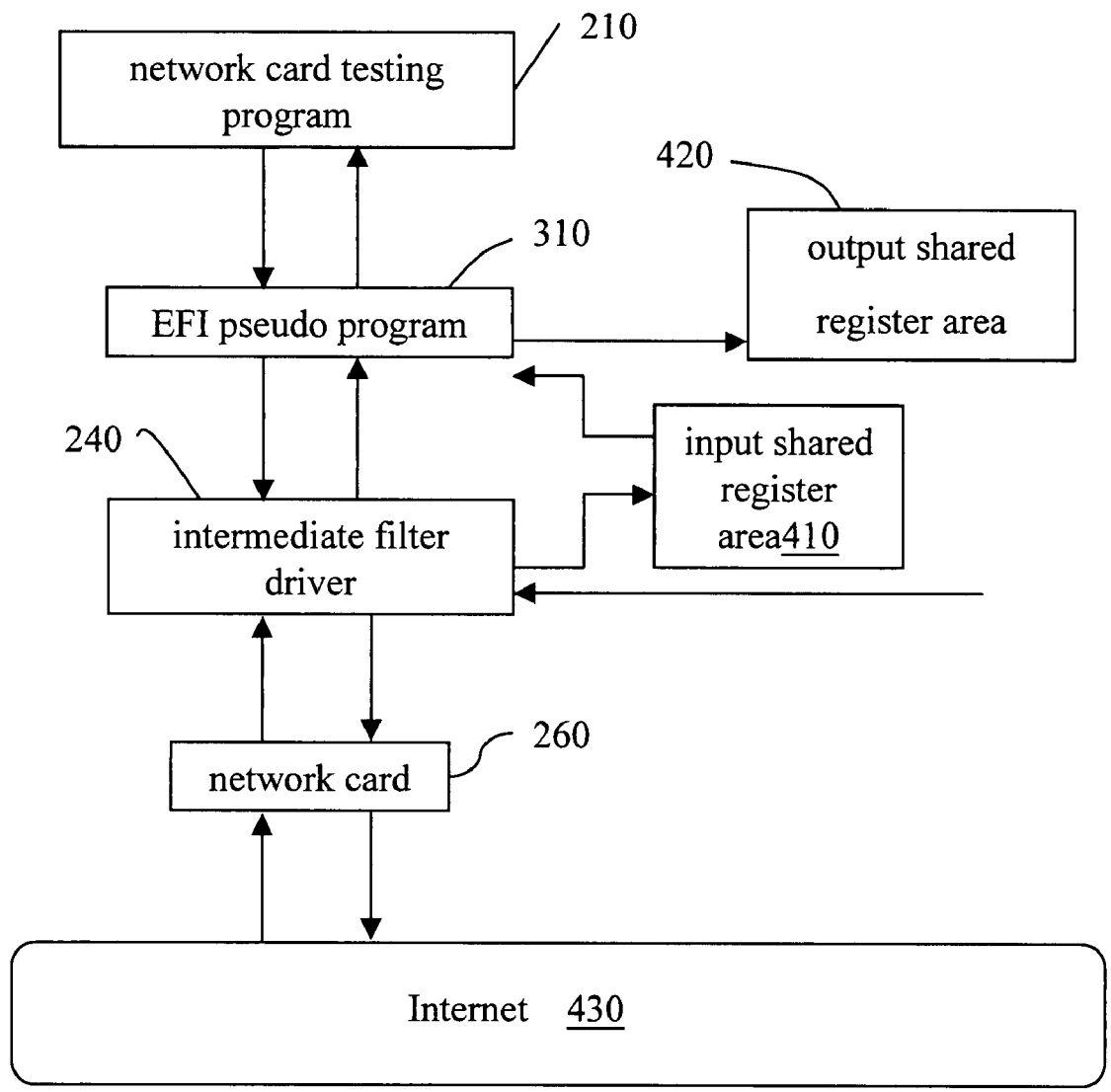
FIG. 4 is a block diagram of a stack structure layout of elements utilized in implementing data transmission of the network card testing method according to a preferred embodiment of the invention.

Usually, in carrying out hardware testing of network card, an actual connection is established to a server of remote terminal, and at least a data file is transmitted back (or returned). In this case, the network card testing program 210 does not exchange data directly with the intermediate filter driver 240, instead, the data exchange is carried out through an EFI pseudo program 310. Refer to FIG. 4 for a block diagram of a structured layout of elements utilized in implementing data transmission of the network card test method according to a preferred embodiment of the invention. As shown in FIG. 4, firstly, the testing of file transmission function of network card is taken as an example, wherein, upon receiving a file transmission command from a network card testing program 210, EFI pseudo program 310 stores the file to be transmitted in an output shared register area 420. At this time, EFI pseudo program 310 invokes a driver corresponding to a network card through triggering an intermediate filter driver 240 by utilizing an output access function. Then, the intermediate filter driver 240 is used to look up a protocol assignment table and obtain the corresponding driver, and also obtain the file to be transmitted from the output shared register area 420 and transmit it to a server in Internet 430 through a network card 260. Secondly, the testing of file receiving function of network card is taken as an example, wherein, upon receiving the data packets transmitted from a server in Internet 430 by network card 260, the intermediate filter driver 240 intercepts these data packets and stores them into a input shared register area 410. Subsequently, the intermediate filter driver 240 reads the data packets from the input shared register area 410 through triggering the EFI pseudo program 310 by an input access function, and transmits the data packets thus obtained to a network card test program 210, hereby proceeding to perform and complete the hardware testing of network card 260, and analyzing the hardware performance of network card by making use of the response time of transmitting/receiving data, and the bit-error rate.

Summing up the above, when the driver for the network card under test is not supported by EFI system, then the additional supporting driver programs can be loaded in by means of NDIS layer, as such through the data exchange between the user-written EFI pseudo program and intermediate filter driver, and also through invoking the driver program of a NDIS layer, the EFI system is enabled to support the testing of network card in a speedy manner, and a complete and thorough hardware testing of network card may thus be carried out through an EFI system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A network card testing method, which is realized through a computer having an Extended Firmware Interface (EFI) system in testing whether several functions of a network card are capable of functioning normally, including the following steps:
   activating an EFI system and loading an EFI network protocol, and registering said EFI network protocol into a protocol assignment table;
   bonding said network card, said EFI network protocol, and a driver of a network driver interface specification (NDIS) layer corresponding to said network card;
   activating an EFI pseudo program, an intermediate filter driver, and a network card test program;
   receiving several testing items of said network card testing program through utilizing said EFI pseudo program, and generating the corresponding test events; and
   invoking said driver corresponding to said network card according to said protocol assignment table by means of said intermediate filter driver, and performing a plurality of network function tests corresponding to said test events.

2. The network card test method as claimed in claim 1, wherein
   said network functions are selected from the following items comprising the group of: establishing connection to a remote terminal, transmitting data, receiving data, adjusting data transmission speed, and disconnecting the connection to a remote terminal.

3. The network card test method as claimed in claim 1, wherein
   said EFI pseudo program stores said test data in an output shared register area, and triggers said intermediate filter driver to read said test data through an output access function in testing said network functions of said network card.

4. The network card test method as claimed in claim 1, wherein
   said intermediate filter driver intercepts the data packets from said network card and stores them into an output shared register area, and triggers said EFI pseudo program into reading said data packets through an input access function, then said EFI pseudo program transmits said data packets thus obtained to said network card testing program.

5. The network card test method as claimed in claim 1, wherein
   said protocol assignment table is a single direction connection table, and is used to record the connection relations of said EFI network protocol, said network card, and said driver required to be invoked corresponding to said network card.

* * * * *